United States Patent
Osinga

(10) Patent No.: US 8,224,362 B1
(45) Date of Patent: Jul. 17, 2012

(54) TEXT MESSAGE SESSIONS

(75) Inventor: Douwe Osinga, Sydney (AU)

(73) Assignee: Google Inc., Mountain View, CA (US)

( * ) Notice: Subject to any disclaimer, the term of this patent is extended or adjusted under 35 U.S.C. 154(b) by 267 days.

(21) Appl. No.: 12/572,035

(22) Filed: Oct. 1, 2009

(51) Int. Cl.
*H04W 4/00* (2009.01)
(52) U.S. Cl. .......................................... 455/466
(58) Field of Classification Search .................. 455/466
See application file for complete search history.

(56) References Cited

U.S. PATENT DOCUMENTS

| | | | |
|---|---|---|---|
| 2003/0036393 A1* | 2/2003 | Kanefsky | 455/466 |
| 2003/0114174 A1* | 6/2003 | Walsh et al. | 455/466 |
| 2004/0185883 A1* | 9/2004 | Rukman | 455/466 |
| 2006/0128404 A1* | 6/2006 | Klassen et al. | 455/466 |
| 2007/0287483 A1* | 12/2007 | Park et al. | 455/466 |
| 2008/0207236 A1* | 8/2008 | Boerries et al. | 455/466 |
| 2009/0088189 A1* | 4/2009 | Hardy et al. | 455/466 |

* cited by examiner

*Primary Examiner* — Nathan Mitchell
(74) *Attorney, Agent, or Firm* — Fish & Richardson P.C.

(57) ABSTRACT

The subject matter of this document can be embodied in, among other things, a computer-method that includes receiving a text message associated with a first telephone number, and establishing a communication session associated with the received text message. The communication session is established by modifying the received text message so that the received text message is associated with a second telephone number that is different from the first telephone number, and subsequent text messages associated with the second telephone number are included as part of the communication session. The method also includes transmitting the text message to a text messaging system, such that the text message appears to have originated from the second telephone number. Upon receiving a text message reply from a user in response to the transmitted text message, the text message reply is associated with the established communication session.

17 Claims, 8 Drawing Sheets

TEXT MESSAGE SESSIONS

TECHNICAL FIELD

This document relates to systems and techniques for tracking text messages.

BACKGROUND

Text messaging has become an increasingly popular mode of communication for mobile device users. With text messages, users can communicate in noisy environments such as nightclubs or restaurants, in quiet environments where users do not wish to disturb others, or when users are otherwise unable or reluctant to communicate audibly. In some cases, text messaging also provides a stored record of the conversation between users. These features, as well as numerous others, have made text messaging the primary mode of communication for some mobile device users.

Certain forms of text messaging are made possible by the short message service (SMS) implemented in most mobile communications systems. SMS is designed to send messages of up to 160 characters between mobile devices, and may also be used for various types of broadcast messaging. Unlike voice communication, text messages are not delivered from the sender to the recipient in real-time. Instead, SMS communication is asymmetric, in that it allows the sent text message to be stored within the SMS system until the recipient mobile device can receive the text message. In some mobile communication systems, text messaging is implemented through other messaging protocols, or by using extensions of SMS, such as multimedia messaging service (MMS), enhanced messaging service (EMS), or the like.

SUMMARY

This document describes systems and techniques that may be used to organize and track text messages by threading the text messages into a session. In general, a telephone number is allocated to a text message to create a channel for the text message and any responsive text messages in the same chain of messages. The channel essentially creates a session that segregates communication between the sender and the recipient into threaded topics based upon the original message of the topic. Because the sender may send multiple text messages to the recipient before the sender receives a response, and because any text message reply from the recipient does not designate to which message the reply is responsive, organizing the sent text messages into separate sessions allows the sender to identify the subject to which the text message reply is responsive. In particular, where a system sends multiple text messages to a particular user, a different number may be used for each initial message, so that responses form the user may be tracked by using the telephone numbers, and the system may easily determine which message a user is responding to.

Particularly with commercial senders, an automated computer system may generate and send multiple text messages related to different topics to a single user or recipient. These text messages may be sent in response to a text message request from the user or as directed messages to the user. Instead of sending text messages of different topics from the same telephone number, a session server may allocate a distinct telephone number to each text message topic to create a channel for the session. The session server may retain a pool of telephone numbers that can be allocated to text messages, where text messages related to a specific topic will share a telephone number, and different topics will have a different telephone number. If all of the telephone numbers in the pool are used for other sessions, the session server may reallocate a previously used telephone number according to pre-determined reallocation criteria.

In one implementation, a computer-implemented method for threading text messages includes receiving a text message associated with a first telephone number, and establishing a communication session associated with the received text message. The communication session is established by modifying the received text message so that the received text message is associated with a second telephone number that is different from the first telephone number, and subsequent text messages associated with the second telephone number are included as part of the communication session. The method also includes transmitting the text message to a text messaging system, such that the text message appears to have originated from the second telephone number. Upon receiving a text message reply from a user in response to the transmitted text message, the text message reply is associated with the established communication session.

In other implementations, a system for threading text messages may include a communication module to receive a text message associated with a first telephone number. The system may also include a session server to establish a communication session associated with the received text message, where the session server establishes the communication session by modifying the received text message so that the received text message is associated with a second telephone number that is different from the first telephone number, and where subsequent text messages associated with the second telephone number are included as part of the established communication session. The system may also include a session database that stores information associated with the communication session, including the text message and the second telephone number. The system further includes a transmission module to transmit the text message to a text messaging system, such that the text message appears to have originated from the second telephone number. Upon receiving a text message reply addressed to the second telephone number from a user in response to the transmitted text message, the text message reply and information associated with the user may be stored in the session database.

In certain implementations, such systems and techniques may provide one or more advantages. For example, a text message reply can be tied to the previous text message to which the reply is responsive. The original sender, e.g., a commercial entity, can then correctly interpret a very short and concise text message instead of deciphering the true meaning of the reply in light of multiple previous text messages. These systems and techniques may also operate without any changes to a sender's computer system or the SMS system of the mobile communication system.

The details of one or more embodiments are set forth in the accompanying drawings and the description below. Other features and advantages will be apparent from the description and drawings, and from the claims.

DETAILED DESCRIPTION

This document describes systems and techniques for organizing and tracking text messages. Such techniques may include allocating a telephone number to text message information to create a channel for the text message information and any responsive text messages on that particular topic. By way of the created channel, all related text messages may be organized into a session that allows easy deciphering of short and/or otherwise cryptic text messages. Because mobile device users commonly reply to text messages with single word answers, the sender may have difficulty associating the single word text message with the appropriate original message, especially if multiple messages have been sent to the same user. Therefore, sending each of the plurality of text messages using different telephone numbers allows a text message reply to be threaded to the appropriate one of the multiple sent text messages.

Creating text message sessions with an allocated telephone number may be particularly helpful for text message communications between commercial entities and individual mobile device users. A computer system for the commercial entity may send text messages to a session server that creates the sessions for separate text message topics. The session server may then allocate a telephone number from a telephone number pool to new text messages, and may insert text messages from a current thread into the appropriate session with the same telephone number. If there are no more telephone numbers available in the telephone number pool, the session server may reallocate a telephone number from an old or infrequently used session to the new text message. In this manner, text message replies are sent to the allocated telephone number to thread the text messages instead of to a general telephone number associated with the commercial entity.

Although text message sessions may be appropriate for commercial entities, e.g., airlines, merchandise sellers, movie theaters, and news distributors, other groups or individuals may also benefit from threading text messages. For example, non-profit organizations may prefer to thread messages when sending text messages soliciting volunteers. As another example, individuals may desire text message sessions when text messaging is the primary form of communication with another mobile device user, especially when the two individuals wish to carry out multiple different discussion threads simultaneously. The techniques and systems described herein are not limited to any particular type of user (e.g., commercial, non-profit, individual, etc.) on either end of the text message sessions.

Figure 1:
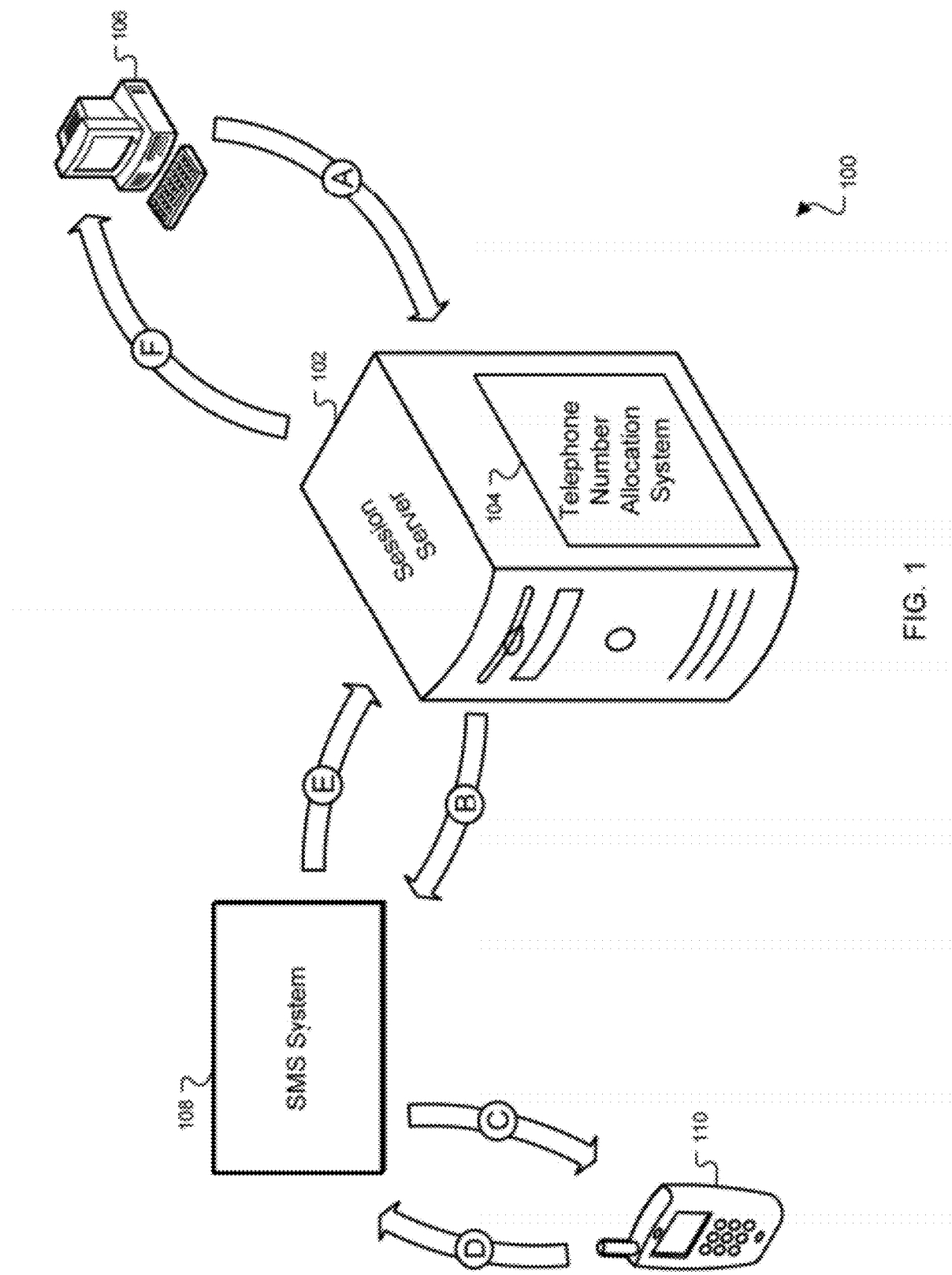
FIG. 1 is a conceptual diagram of a system for creating text message sessions between a computer system and a mobile device user.

FIG. 1 is a conceptual diagram of a system 100 for creating text message sessions between a computer system 106 and a user of a mobile device 110. The text message session system 100 includes a computer system 106, a session server 102, a short message service (SMS) system 108, and a mobile device 110, or any other device capable of sending and receiving text messages. Session server 102 may include a telephone number allocation system 104 that allocates a telephone number to text message information to create a session for responsive text messages. Users of the system 100 can utilize convenient and short text messages to communicate while keeping track of the appropriate context of each text message.

A computer system 106 may be operated by an entity that distributes text message information to mobile device users. The text message information may be sent to one or more users as a solicitation, in response to a user request, or in response to the user opting-in to a distribution list, for example. The computer system 106 may automatically generate text message information, or may generate text message information from instructions received from a human representative of the entity.

Automatically generated text messages may be created, for example, based on software instructions executed by the computer system 106. The software instructions may generate the content of the text message information (e.g., based on an a content generation engine, an advertisement generation engine, etc.) and the intended target of the text message information. The instructions may also define the date and time the text message information should be sent. For example, at a predetermined time, the computer system 106 may automatically generate a text message advertising flight deals based upon flight pricing at that particular time. Although a general text message may be targeted to several users, the text message information may also be tailored to target each particular user that receives the text message information. For example, the system computer system 106 may insert personal information such as the user's first name into the text message to provide some personalization to the message. The software instructions and/or rules engine used to automatically generate such text messages may be periodically updated to reflect current trends or information.

Alternatively, a human representative may interact with the computer system 106 to generate at least a portion of the text message information. In certain implementations, the representative may specify the date and time to send the text message. The representative may also create or review the content of the text message information before the text message information is sent to the session server 102. For example, a user may have sent an initial text message requesting information about a particular product or service. If an automatic response to the request is not available, a representative may need to create the appropriate text message content before the computer system 106 can send the text message information responsive to the request. If the response contains appropriate reusable content, it may be subsequently stored as an automatic response to similar user requests.

Regardless of how the text message is generated, the computer system 106 may send the text message information to session server 102, as indicated by the arrow labeled A. Session server 102 receives the text message information and uses telephone number allocation system 104 to thread the text message information into a session, as described in greater detail below.

In some implementations, if the text message information from computer system 106 is in response to an already created session, then the same allocated telephone number may be associated with the text message information in the session database stored in the telephone number allocation system 104. If the text message information from computer system 106 is starting a new session, the telephone number allocation system 104 may allocate a telephone number from a telephone number pool to the text message information, and update the session database accordingly. If all telephone numbers in the pool are being used for other text message sessions, the telephone number allocation system 104 may reallocate a previously used telephone number from an old and/or infrequently used session. Once the telephone number is reallocated, the older session may be saved, archived, or deleted from the session database, depending on the policies used to administer such information.

Session server 102 may operate as the distributor of text messages from a computer system 106 to an SMS system 108. Typically, the session server 102 is operated by the same entity as the computer system 106 or by a third party, and the SMS system 106 is operated as part of the wireless communication system that services mobile device 110. However, the wireless communication system may also operate session server 102 as an additional service to the entity that generates the text message information.

The telephone numbers allocated to the text message information by session server 102 may be dummy telephone numbers that are used for the purpose of threading the text message sessions. Whereas text messages normally transmitted from the entity controlling a computer system 106 would be sent from a telephone number associated with the organization, session server 102 may instead use a telephone number from a general telephone number pool as the sending telephone number. The text message information sent from session server 102 to SMS system 108 is then sent via the allocated telephone number, as indicated by the arrow labeled B.

After the SMS system 108 receives the text message from the session server 102, the SMS system 108 stores the text message until mobile device 110 is able to retrieve the text message. As shown by the arrow labeled C, the SMS system 108 may then deliver the text message to mobile device 110 over the communication network servicing mobile device 110. The user of mobile device 110 may then review the text message information that has been retrieved from the SMS system 108. The user may receive multiple text messages from the same entity or different entities, and the user may decide to respond at any time, if ever.

If the user of mobile device 110 wants to respond to one of the received text messages originally generated by the computer system 106, the user can create a text message reply on the mobile device 110. The text message reply may be a short message, sometimes as short as a single word or character. Mobile device 110 then transmits the text message reply to SMS system 106 over the communication network, as indicated by the arrow labeled D.

In alternative examples, the user may respond to the text message information without sending a text message reply. The user may instead use mobile device 110 to call the allocated telephone number to speak to a representative of the entity sending the previous text message. Such a call by the user may be directed to the allocated telephone number and to session server 102. Session server 102 may subsequently route the call to the computer system 106, and the call may be routed to an appropriate representative. The system may funnel all calls to a central customer representative processing center, or it may route the call to a particular representative or group of representatives based on the particular threaded session to which the particular telephone number corresponds. In some implementations, the session server 102 may also forward the related text message session information so that the answering representative can review the previous communication and more efficiently assist the user.

As shown by the arrow labeled E, the SMS system 108 may forward the text message reply sent by mobile device 110 to the session server 102. The telephone number allocation system 104 may recognize that the text message reply has been made to a previously allocated telephone number, and may insert the text message reply into the particular session associated with that telephone number. Session server 102 may then associate the text message reply to the previous text message information sent by a computer system 106, and may forward the text message reply to the computer system 106, as indicated by the arrow labeled F. In some implementations, the session server 102 may forward either the entire text message session or portions of the session to the computer system 106 to enable the entity to easily review the communications that had previously been sent and received in the session.

The computer system 106 may perform any number of actions upon receiving the text message reply from the session server 102. For example, the computer system 106 may confirm a purchase of an item indicated by the text message information, retrieve additional information for the user, and/or send another text message in response to the text message reply. Any further text messages would be routed back to the user as a part of the same session according to the previously identified techniques.

The entity operating and/or controlling the computer system 106 may be any type of entity, including commercial, non-commercial, or governmental entities. Example entities may include airlines, car dealerships, movie theaters, merchandise sellers, news outlets, social networking services, restaurants, bill collectors, electronic auction services, governmental agencies, or any other entity that communicates via mobile devices. An individual operator may also operate and/or control the computer system 106. The session server 102 may be configured to create sessions by allocating telephone numbers for one individual or entity, or may serve multiple individuals or entities. Accordingly, the text message session the system 100 may be utilized in a number of different configurations to conduct business, confirm schedules, and/or simply exchange information between two parties.

Figure 2:
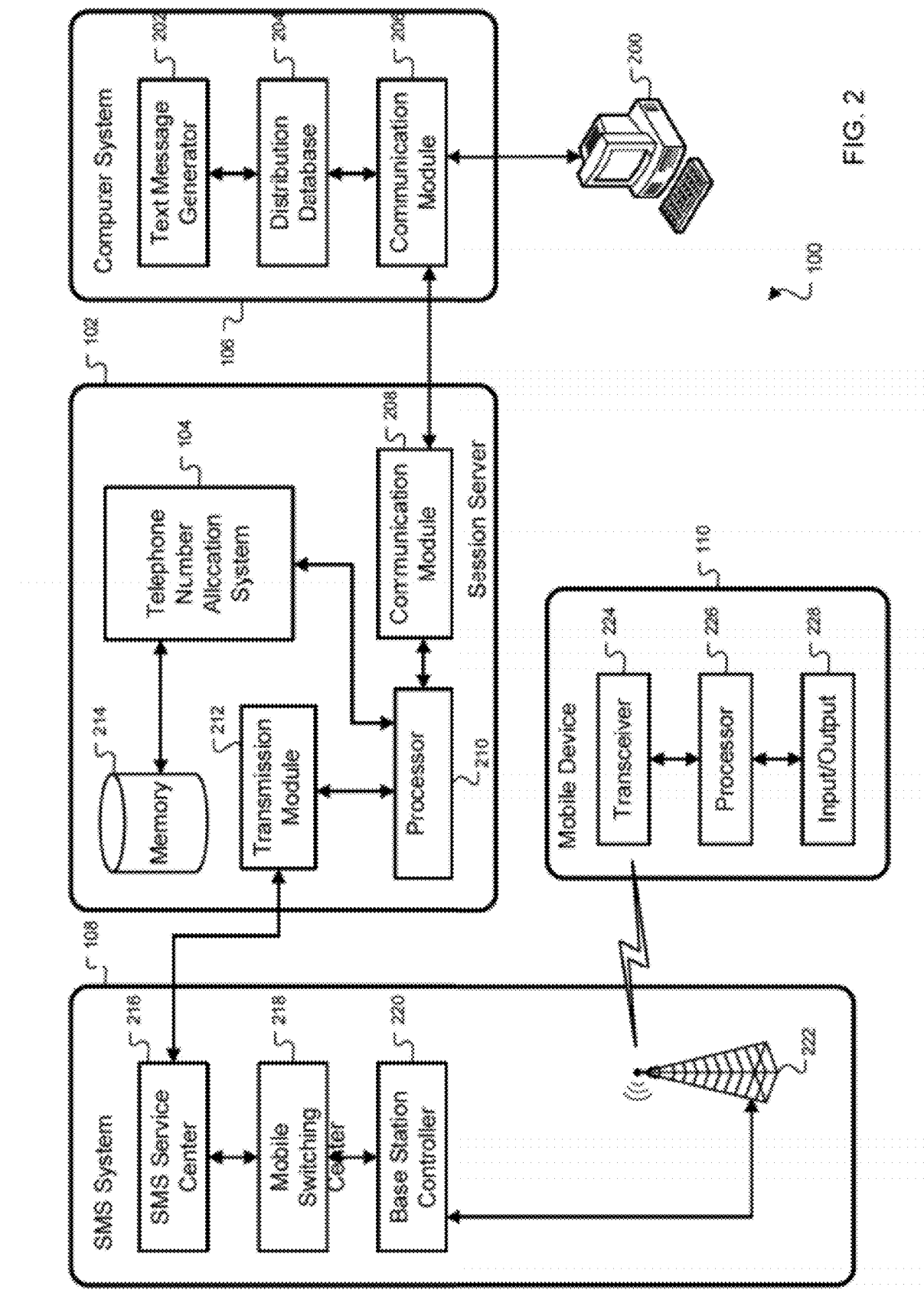
FIG. 2 is a block diagram of a representative text message session system.

FIG. 2 is a block diagram of a representative text message session system 100. As shown, the system 100 includes a computer system 106, a session server 102, an SMS system 108, and a mobile device 110. Workstation 200 allows a representative to communicate with a computer system 106 to generate text message information or to update the software that automatically generates text message information. Workstation 200 may be any type of computing device, such as a desktop or laptop computer, a handheld device, etc., and may be connected directly or via an interface to computer system 106.

The computer system 106 includes a text message generator 202, a distribution database 204, a communication module 206, and other circuits and modules required to operate a computer system 106 according to the techniques described herein. The text message generator 202 generates the text message information that is to be delivered to the user. It may automatically generate the text message information using instructions stored within a memory upon receiving instructions or time prompts to do so. The text message generator 202 may also generate the machine language necessary to send the text message through the SMS system 108 and on to a mobile device 110.

The text message generator 202 may be configured to communicate with a distribution database 204 to select particular users who are to receive the generated messages. The distribution database 204 may contain a list of users who have been added, for example, following an opt-in request for a particular distribution list. The users in the distribution database 204 may also have been added due to some previous activity of the user, or by the user requesting specific information relating to the distribution list. A user may also be added to the distribution database 204 upon initiating a communication with the computer system 106, such as by requesting information from the system. The distribution database 204 may include the telephone number of a mobile device 110 associated with each of the users in the database, and may also include various other information about the user, such as the user's name, physical address, e-mail address, or any other information related to the user.

In some implementations, the text message generator 202 may perform fewer functions as a representative may instead create at least a portion of the text message information via workstation 200. The representative may input the content of the text message if the content is specific, such as if the text message is responsive to a unique text message request or reply. The representative may also or alternatively modify standard text message content, insert required content into a standard template, or review content created by the text message generator 202. Additionally, the representative may select the intended user from the distribution database 204 or input the user information via workstation 200. Accordingly, a computer system 106 may not operate as autonomously as described above. Similarly, other components or portions of the system may be used to perform some of the techniques described herein.

The computer system 106 may include any number of workstations, desktop or laptop computers, servers, or other computing systems that are configured to generate text message information to be sent to a user. In some implementations, a representative may directly connect to a user interface of the computer system 106. In other implementations, the computer system 106 may be a subcomponent of a larger computing system that performs additional services.

After the text message information has been generated in the computer system 106, it may be delivered by a communication module 206 of the computer system to a communication module 208 of the session server 102. The communication modules 206, 208 may be connected by any networking system commonly used in the art. For example, communication modules 206, 208 may be connected via a local area network (LAN), a wide area network (WAN), a wireless network, or other types of networks or combinations thereof. The system 100 may, in certain implementations, incorporate encryption algorithms to maintain security of the communications routed through system.

As shown, the session server 102 includes a telephone number allocation system 104, a communication module 208, a processor 210, a transmission module 212, and memory 214. After the text message information is received by the communication module 208, it may be routed to the telephone number allocation system 104, which may analyze the text message information and determine if it belongs to a previously defined channel and session.

If the text message information should be associated with a previously defined session, the telephone number allocation system 104 attaches the allocated telephone number and updates the session database stored in memory 214. If the text message information is new, the telephone number allocation system 104 allocates or reallocates a telephone number to the new session of the text message information and updates the session database stored in memory 214. The allocation system 104 then sends the telephone number and text message information to the transmission module 212 to transmit the text message information to the appropriate user device via the SMS system 108. Further details about the telephone number allocation process are described in connection with FIG. 3.

The SMS system 108 operates according to standard SMS systems in the industry and within the context of the wireless network over which voice calls and text messages are sent and received by mobile device 110. The SMS system 108 may include, among other components, an SMS service center 216, a mobile switching center 218, a base station controller 220, and a transceiver 222. It should be noted that typical SMS systems include a plurality of mobile switching centers 218 and base station controllers 220, but only one of each element is described for the sake of simplicity.

The text message information transmitted by the session server 102 is received by the SMS system 108 at the SMS service center 216. The SMS service center 216 stores the received text message until the text message can be delivered to the appropriate mobile device 110. When the mobile device 110 is capable of receiving text messages, the SMS service center 216 sends the text message to the mobile switching center 218 which coordinates the location of the mobile device 110 within the wireless network. The mobile switching center 218 then sends the text message to a base station controller 220 and on to a connected transceiver 222. The transceiver 222 transmits the text message over the air interface to the mobile device 110. In circumstances when the mobile device 110 cannot receive the text message, the SMS service center 216 may store the text message until the device 110 can be reached. In some cases, the text message may be deleted if not retrieved by the mobile device 110 after a certain period of time.

After the text message is transmitted over the air interface by transceiver 222, the text message is received by transceiver 224 of mobile device 110. The text message information may then be processed by processor 228 and stored in a memory for review by the user. The user may view the text message information by interacting with input/output 228 components available on the device. Input/output 228 may be in any combination of a viewable screen, touch screen, keypad, pointing device, scroll wheel, or any other appropriate user interface.

Using input/output 228, the user may generate a text message reply to the text message information received from a computer system 106. Alternatively, the user may generate an initial text message request with input/output 228. The user may subsequently send any text message generated on the device when transceiver 224 of mobile device 110 is communicably connected to transceiver 222 of SMS system 108.

Mobile device 110 may be any type of mobile computing device capable of receiving text messages. Generally, mobile device 110 may be a cellular telephone or smartphone configured for voice communication and text messaging communication. However, mobile device 110 may instead be a netbook computer, notebook computer, or any other device configured to receive text messages as described herein.

Figure 3:
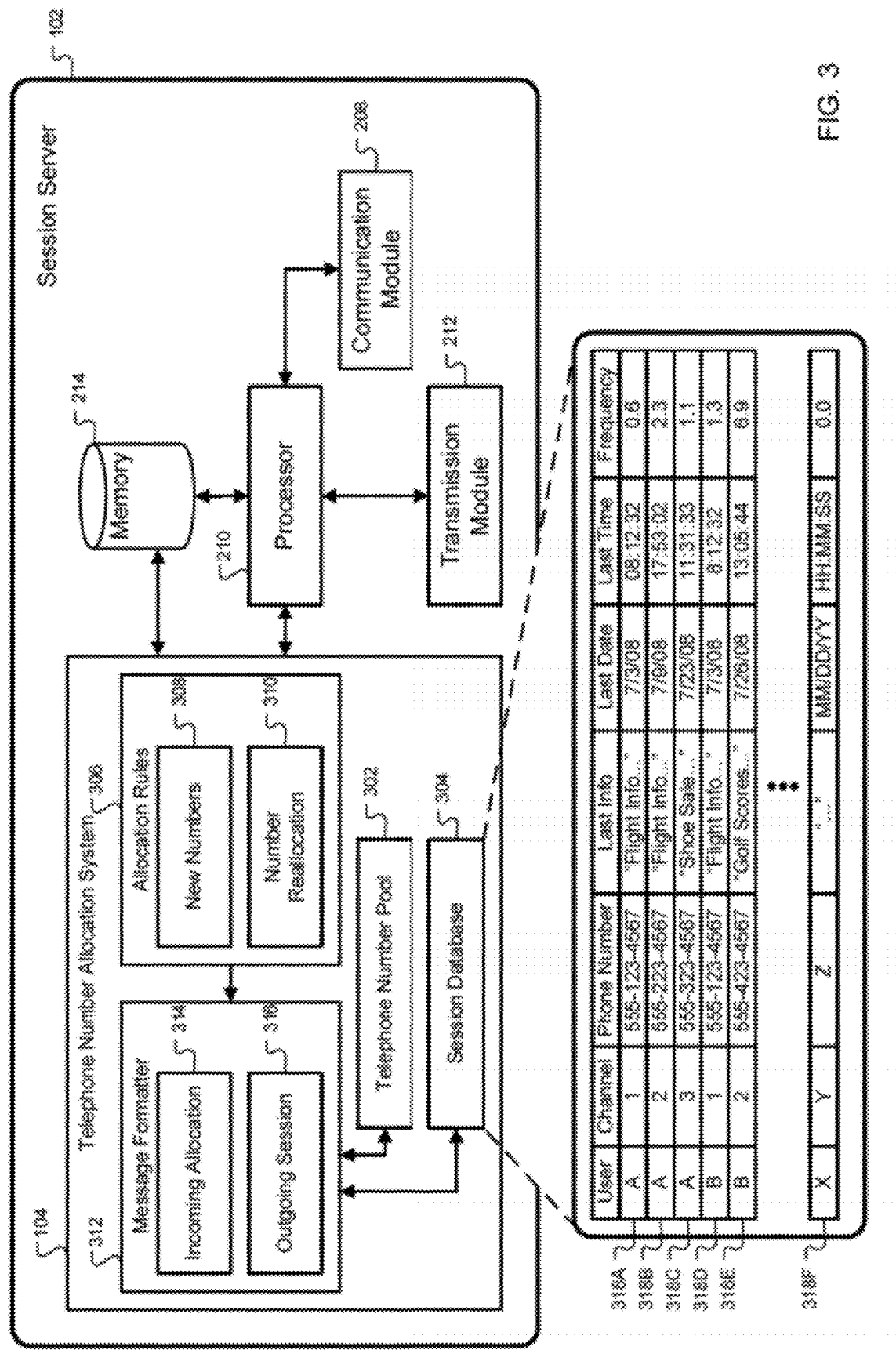
FIG. 3 is a block diagram of a representative session server that allocates telephone numbers to text messages and maintains a session database of allocated telephone numbers.

FIG. 3 is a block diagram of an example session server 102 that allocates telephone numbers to text messages and maintains a session database 304 of allocated telephone numbers and associated information for the session. As shown in FIG. 3, session server 102 may include a communication module 208, a transmission module 212, and a telephone number allocation system 104.

Session server 102 may also include additional components commonly used to operate a computer system. These types of components may include interfaces and buses, such as those described in FIG. 8. Session server 102 may be a single computing device, or may be a component of a larger server stack, farm, or distributed server system. In some implementations, session server 102 may be a partition of a single server.

Processor 210 may be used to facilitate communications with the telephone number allocation system 104 to thread incoming text messages into a session that allows the text messages to be tracked like a conversation. telephone number allocation system 104 may include a message formatter 312, allocation rules 306, a telephone number pool 302, and a session database 304. The data stored for each of these modules of telephone number allocation system 104 may be stored within memory 214. Some embodiments may include multiple memories for storing data in separate locations.

The telephone number allocation system 104 utilizes a session database 304 to track and organize the text message sessions defined by allocated telephone numbers. The session database 304 may be stored within memory 214 and maintained by the telephone number allocation system 104. The session database 304 may include the information used to track text messages of each session by the allocated telephone number. For example, the session database 304 may include data fields such as "user," "channel," "phone number," "last info," "last date," "last time," and "frequency." In some examples, session database 304 may include more or fewer fields for maintaining the text message sessions.

The "user" field, for example, may indicate the individual user of mobile device 110 to which the text message information is directed. In the session database 304, users are identified by "A," "B," or any other letter or group of letters. In other examples, the user field could store the actual telephone number or name of the particular mobile telephone 110 to identify individual users. However, such information may not be stored in certain implementations to satisfy any privacy or non-disclosure agreements between the users and the entity operating a computer system 106.

The "channel" field may indicate which channel, or session, has been created with the allocated telephone number for any particular user. For example, the telephone number allocated to channel 1 for user A may be different than the telephone number allocated to channel 1 for user B. Accordingly, the "phone number" field identifies the allocated telephone number for that channel and session. When the session is currently active and a telephone number is allocated to the text message conversation, the allocated telephone number is present in the telephone number field for each entry of the session database 304. If the telephone number is removed and reallocated to a new text message session, the old session may be removed from the session database 304. In other examples, the session database 304 may retain the old session information, with or without the removed telephone number. If the formerly allocated telephone number remains for archiving purposes, the telephone number may be marked as inactive for that particular session.

In addition, the session database 304 may include data identifying the types of text message information sent within the session. For example, the "last info" field may include the entire content of the most recent text message of the session. The "last date" field may include the date of the most recent activity, and the "last time" field may include the time of day in the twenty-four hour format that the most recent text message was sent. The session database 304 may further include a "frequency" field to indicate how often text messages are sent within the session. In some implementations, the frequency may indicate the number of text messages per week being sent and/or received in the session. However, the session database 304 may set the frequency to use any desired time period. Although not shown in FIG. 3, the session database 304 may also store the text message content of each previous text message within the session. In some implementations, the session server 102 may then forward the entire conversation to a computer system 106 to reduce any ambiguity from a short and concise text message reply from the user. Alternative embodiments of the session database 304, or multiple databases, are also contemplated herein.

As shown, the session database 304 may be used to maintain multiple sessions 318A, 318B, 318C, 318D, 318E, and 318F (collectively "sessions 318") simultaneously. Session 318F indicates a future entry for more sessions. Sessions 318 are merely example sessions for two users "A" and "B." For each user, sessions 318 may include a maximum number of channels equal to the number of telephone numbers available in telephone number pool 302. In addition, the same telephone number may be used to create different channels for different users. Sessions 318 only show active channels, or those channels with currently allocated telephone numbers. However, in some implementations, the session database 304 may retain inactive sessions that have had the associated telephone number reallocated to another session.

When the session server 102 receives text message information from a computer system 106, the text message information may be routed to a message formatter 312 of the telephone number allocation system 104. The message formatter 312 may use an incoming allocation module 314 to allocate a telephone number to the received text message information. If the text message information is related to an already created session, the incoming allocation module 314 may insert the text message information into the session and attach the associated telephone number by updating the session database 304. If the text message information is not related to a previously defined session, then a telephone number may be allocated to the text message information.

To allocate a telephone number to the text message information, the message formatter 314 may reference one or more allocation rules 306, which may be stored in memory 214, and review the telephone number pool 302. The telephone number pool 302 may include all of the telephone numbers that can be allocated to create a channel for the text message session. The telephone number pool 302 may be stored in memory 214 and may include any amount of telephone numbers. For example, the telephone number pool 302 may include ten telephone numbers that may be allocated to text message sessions. In some implementations, the telephone number pool 302 may have as few as two telephone numbers or more than one hundred telephone numbers.

If any of the telephone numbers from the telephone number pool 302 are not allocated to a text message session, the incoming allocation module 314 may select one of the non-allocated telephone numbers from the telephone number pool 302 to assign to the incoming text message information according to one or more new numbers rules 308. The new numbers rules 308 may simply instruct the incoming allocation module 314 to select the first telephone number from the pool. On the other hand, the new numbers rules 308 may instruct that the telephone number should be chosen at random, by a specific order of area code, or some other appropriate method. The allocated telephone number and text message information may then be added to the session database 304 as a new session.

In some implementations, the telephone number pool 302 may only contain a limited quantity of telephone numbers. If all the telephone numbers in the telephone number pool 302 have already been allocated, then the incoming allocation module 314 may reallocate a previously used telephone number from one of the other channels or sessions. One or more number reallocation rules 310 may contain the instructions that determine how the telephone number allocation system 104 removes a previously allocated telephone number before allocating it to a new text message session. Although any previously allocated telephone number could be reallocated to a new session, it may be beneficial to re-assign numbers in a manner that causes the least disruption to conversations between parties.

The number reallocation rules 310 may cause the telephone number allocation system 104 to select and reallocate a telephone number based upon the date of the most recent text message associated with the telephone number, the frequency of the text messages associated with the telephone number, the quantity of text messages associated with each of the plurality of telephone numbers, or some other indication of session use. If two sessions are equally old, the number reallocation rules 310 may apply a secondary rule to determine the least used or least important session for the specific user. In other implementations, if two sessions are equally used, the number reallocation rules 310 may apply a secondary rule to determine the oldest or least important session for the specific user.

For example, the telephone number allocated to the session with the oldest most recent text message for the user in question may be chosen to be reallocated to the new session. In FIG. 3, telephone number "555-123-4567" of session 318A, for example, may be reallocated to a new session for user "A" because session 318A would have the oldest most recent text message of Jul. 3, 2008. In another example, the session with the least frequent text messages may have its telephone number reallocated to a new session. In FIG. 3, the telephone number from session 318A would be reallocated for a new session of user "A."

In certain circumstances, the same text message information may be sent to multiple users. Sessions 318A and 318 D, for example, indicate that "Flight Info . . . " was sent to both users "A" and "B" on the same date and time. When the telephone number allocation system 104 allocated the telephone number to the text message information, the same telephone number was allocated to the text message information for each user. However, different telephone numbers may be allocated to the same text message information being sent to different users. In some implementations, the allocated telephone number may primarily be used to differentiate conversation sessions from the same user. This can appropriately distinguish between otherwise conflicting sessions because the user telephone number, the telephone number of mobile device 110, may also be used to differentiate the session from other users.

Various allocation rules 306 may also determine how the telephone number allocation system 104 maintains the format of the session database 304. For example, the new numbers module 308 may specify that a new session with a new number results in a new session being added to the session database 304 for the user. The number reallocation rules 310 may specify how the new session is inserted into the session database 304. For example, if old sessions are not to be saved, the information for the new session may simply replace the "last info," "last date," "last time," and "frequency" fields of the old entry. If old sessions are to remain stored in the session database 304, the "channel" and "phone number" may be removed from the session entry and added to a new entry for the new session. In other implementations, the allocation rules 306 may specify different methods for maintaining the session database 304 when telephone numbers are allocated or reallocated to new sessions.

After the session database 304 is updated with information from the incoming text message, an outgoing session module 316 of the message formatter 312 may generate the text message that is sent to SMS system 108 or the text message that is forwarded to a computer system 106. For text messages that are to be sent to the user via SMS system 108, the outgoing session module 316 may format the text message to include the text message information from the computer system 106, the telephone number of the intended user, and the allocated telephone number as the number the text message was sent from. For text messages to be sent to the computer system 106, the outgoing session module 316 may format the text message so that the computer system 106 can identify the context of the text message. This formatting may include, for example, attaching one or more text messages of the session and/or forwarding the entire session to the computer system 106. In some implementations, only certain portions of the session may be sent to the computer system 106, such as the two most recent session transactions. In other examples, the outgoing session module 316 may attach the channel number for the session for session identification by the computer system 106. In any case, the text message may be forwarded such that the computer system 106 can identify to which text message information the text message reply is responsive.

Memory 214 may store data received and/or generated by the telephone number allocation system 104, such as the maintained session database 304. Memory 214 may also store allocation rules 306 and any other instruction used to operate the message formatter 312. Although memory 214 may be a single component, memory 214 may, in certain implementations, be distributed over multiple storage components. Memory 214 may be embodied as one or more hard disk drives, volatile memory modules, flash memory drives, or any other components configured to store data for the session server 102. Memory 214 may also be at least partially located or backed up outside the context of the session server 102.

Although the allocation and reallocation of telephone numbers have been described as being performed by a processor of the telephone number allocation system 104, the processor 210 may perform all or a certain portion of these tasks. The processor 210 may be one or more processors that facilitate communications with the telephone number allocation system 104 to perform the tasks of session server 102 described herein. In alternative embodiments, the processor 210 may distribute at least a portion or the processing tasks to other processing components located outside the context of the session server 102.

Communications between the session server 102 and the computer system 106 may be performed by communication module 208. These communications may include, for example, receiving text message information from the computer system 106 and forwarding text message requests or replies from the session server 102 to the computer system 106. The communication module 208 may be a circuit capable of sending and receiving wired or wireless signals within a local network or over the internet. For example, the communication module 208 may operate according to IEEE 802.3 LAN protocols, 802.11 wireless network protocols, or any other standard protocols in the industry.

Transmission module 212 may provide an interface for text messages between the session server 102 and the SMS system 108. If the session server 102 is operated within a wireless communication network, the transmission module 212 may be configured to communicate directly with the network and SMS system 108. If the session server 102 is operated outside of the wireless communication network, the transmission module 212 may be configured to send and receive information to and from an internet service provider (ISP) or other service or interface that connects to the world wide web, for example.

In alternative examples, the functions of the communication module 208 and transmission module 212 may be performed by a single circuit or module. In this manner, communications between the session server 102 and any other system, e.g., SMS system 108 and the computer system 106, are handled by a single module within the session server 102. This configuration may be especially helpful if all communications occur via a common communication protocol.

Figure 4:
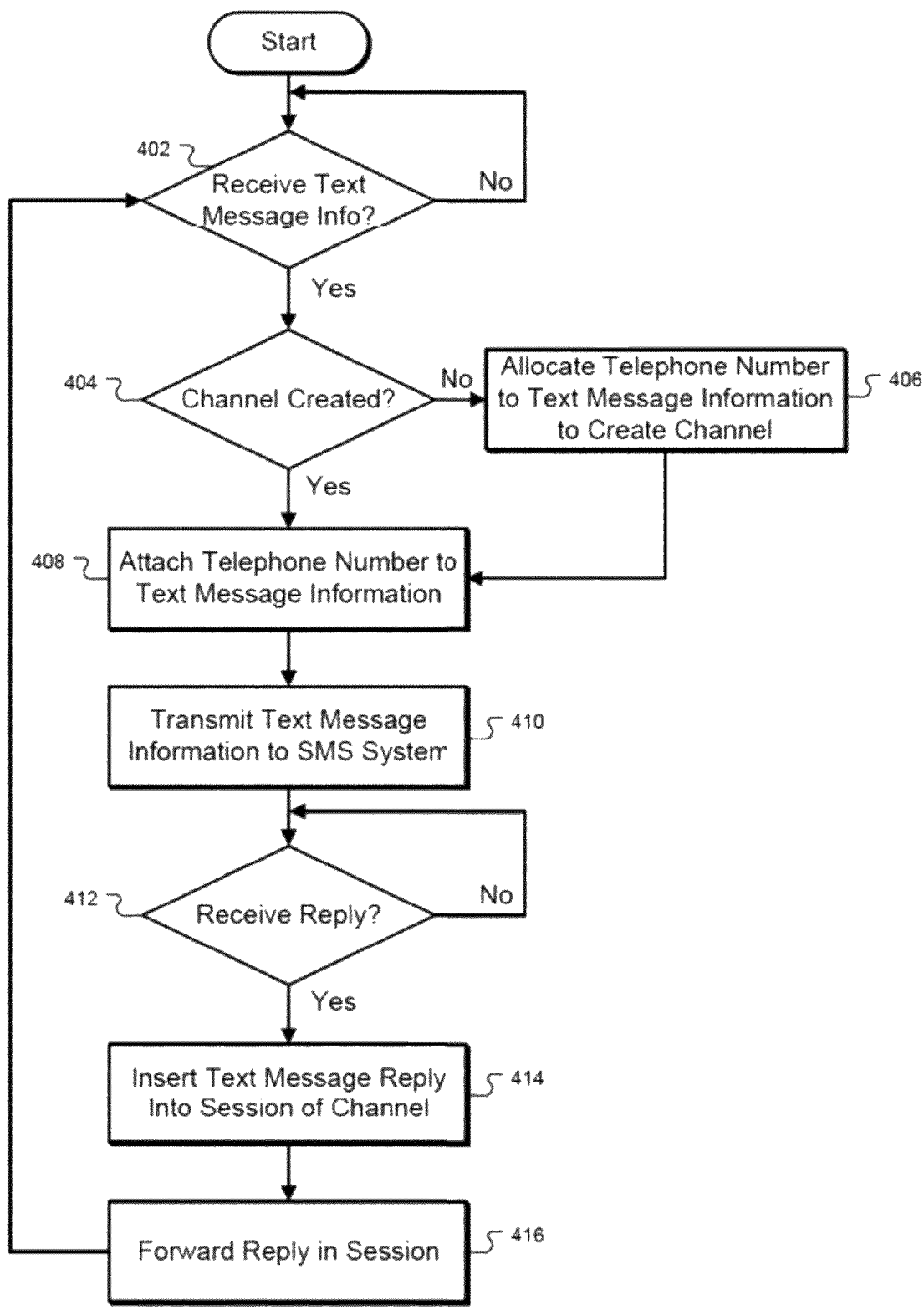
FIGS. 4 and 5 are flow charts of representative processes for distributing text messages in channels defined by allocated telephone numbers.
Figure 5:
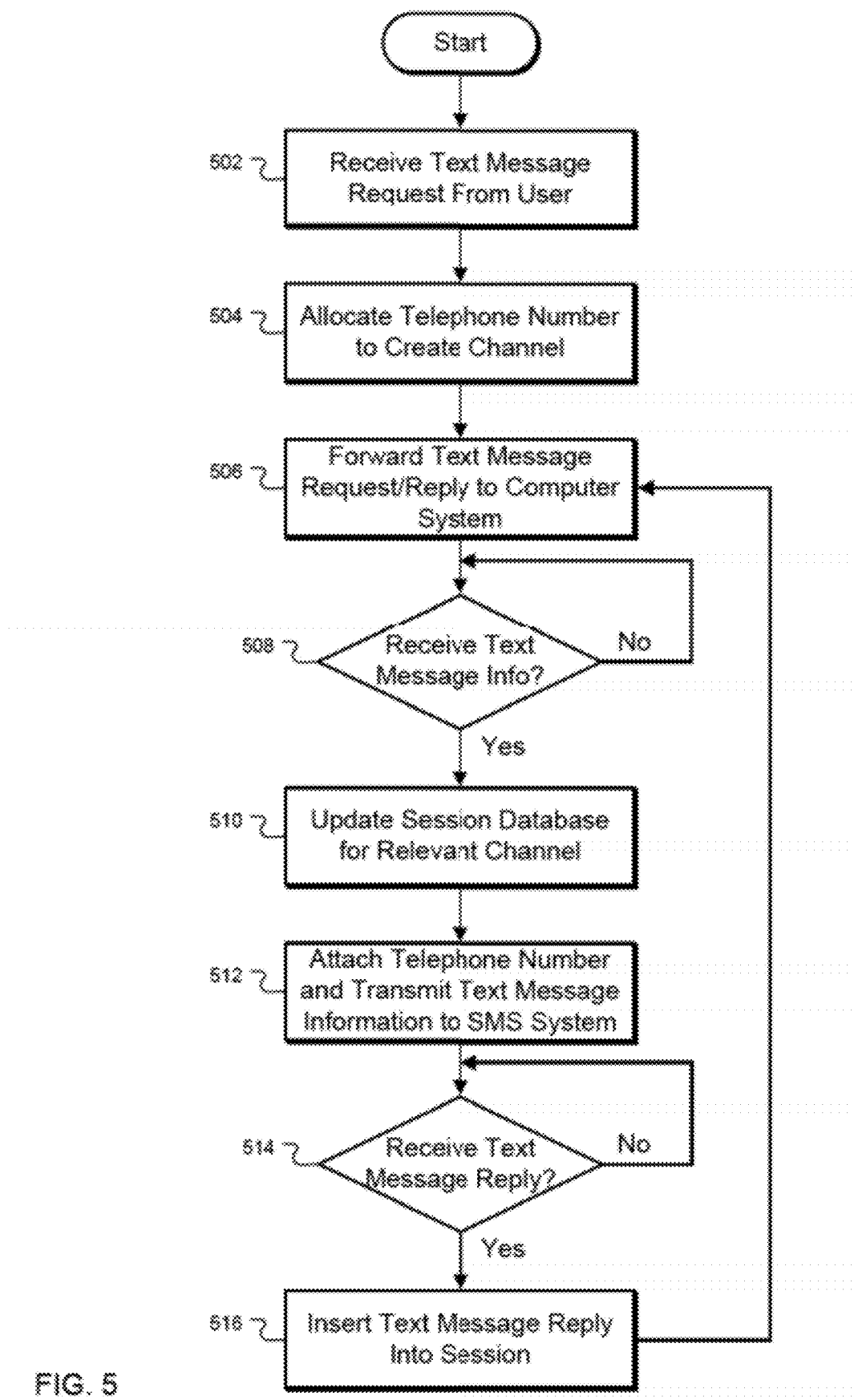

FIGS. 4 and 5 are flow charts of example processes for distributing text messages in channels defined by allocated telephone numbers. As shown in FIG. 4, a session server or other appropriate system creates and handles a channel for text messages upon receiving text message information from a computer system. The session server first receives (402) the text message information, for example, from a computer system. The text message information may include text message content for the user to review and the user's telephone number. In some examples, the text message information may also include the entity's telephone number or other identifier in the text message information that indicates the origin of the text message.

A telephone number allocation system may review the received text message information and determine (404) if the text message information belongs to a new or already created session. If no channel has been created because the text message information belongs to a new session, then the processor may allocate (406) a telephone number, for example from a telephone number pool, to create the new channel for future responsive text messages in the session. The processor may then attach (408) the allocated telephone number to the text message information and may update a session database accordingly. If the channel has already been defined by a telephone number, the processor may insert the text message information into the session database and attach (408) the allocated telephone number to the text message information. After attaching the telephone number, the full text message information is complete with text message content, sender telephone number, and receiver telephone number.

The session server may transmit (410) the full text message information, including the text message content, sender telephone number, and receiver telephone number to an SMS system. The SMS system may, in turn, distribute the text message to a mobile device of a user, as identified by the receiver telephone number. In some implementations, the session server may keep the text message session open until a text message reply is received (412) from the user. In some implementations, the session server may keep the text message session open until the telephone number allocated to the sent text message information needs to be assigned to a new session. Once a text message reply is received (412) by the session server, the processor of the telephone number allocation system may insert (414) the text message reply into the session of the channel defined by the allocated telephone number. Insertion of the text message information may include, for example, updating a session database with the received reply. The session server may then forward (416) the text message reply to a computer system for further processing.

After the text message reply is forwarded, the process may continue if the session server receives responsive text message information for the same session. The technique described in FIG. 4 may continue as long as the telephone number of the session is still in use (e.g., the session has not been closed and/or the telephone number has not been reallocated to a different session, etc.).

As shown in FIG. 5, text message sessions may also be created by an initial text message request from a user. For example, a session server may receive (502) a text message request from the user via an SMS messaging system. The text message request may be a request that the user be placed on a text message mailing list, or may be a more specific inquiry where the user requests a specific response from a target entity. Since the text message request from the user begins a new topic, a new session may be created by a session server of the target entity. In particular, a processor of the session server may facilitate the allocation (504) of a telephone number to create a channel for the text message request and subsequent responsive text messages. The processor may allocate an unused telephone number, for example from a telephone number pool, or may reallocate a telephone number from the pool if all telephone numbers in the pool have been previously allocated.

After the session is created, the session server may forward (506) the text message request to the computer system via a communication module. The session server may then wait to receive any responsive text message information from the computer system that is directed to the user. When the session server receives (508) text message information directed to that session, the processor may update (510) a session database and the relevant channel with the text message information. The processor may attach (512) the telephone number allocated to the channel and session and transmit the text message information to an SMS system.

If the session server receives (514) a text message reply from the user to the allocated telephone number, the processor of the telephone number allocation system may insert (516) the text message reply into the appropriate session by updating the session database. The session server may also further process the text message reply by forwarding the reply to the computer system to continue the conversation over the channel.

Figure 6:
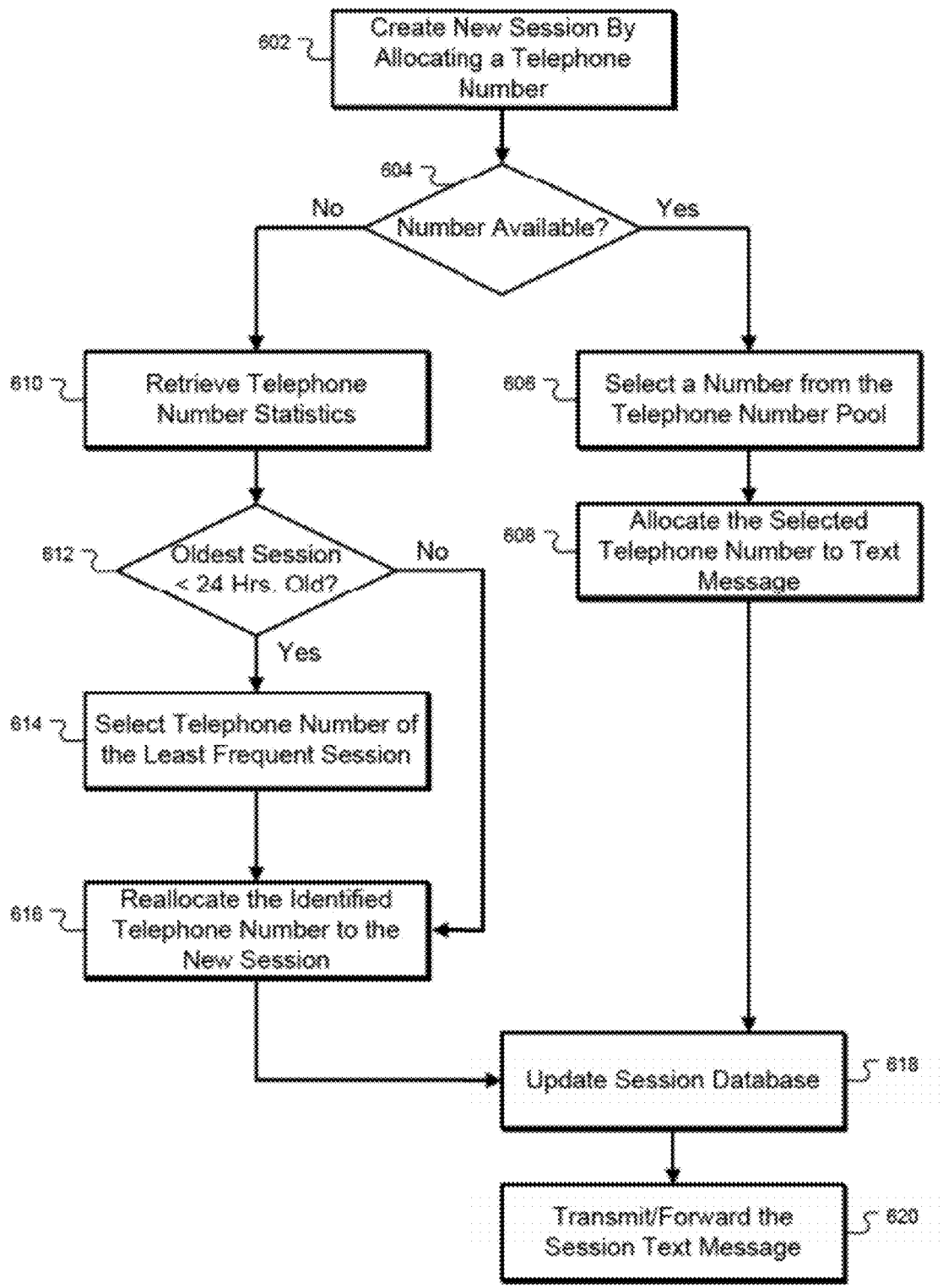
FIG. 6 is a flow chart of a representative process for allocating and reallocating telephone numbers to text messages.

FIG. 6 is a flow chart of an example process for allocating and reallocating telephone numbers to text messages. As shown in FIG. 6, a session server may allocate telephone numbers to text messages using only the telephone numbers available in a telephone number pool. The processor of the telephone number allocation system may create (602) a new session by allocating a telephone number to create a channel for subsequent text messages in the session. The process may include checking a pool of telephone numbers and a session database to identify (604) if any telephone numbers are available.

If one or more numbers are unassigned, or unallocated to a text message session, then the processor may select (606) one of the available telephone numbers from the telephone number pool. The processor may select from the available telephone numbers according to various rules associated with selecting new numbers, as described above. For example, the telephone number may be selected at random, by area code, or by some other selection criteria. The processor may allocate (608) the selected telephone number to the text message, and may update (618) a session database with the allocated telephone number.

If all of the telephone numbers in the telephone number pool are assigned, or otherwise allocated, the processor may retrieve (610) telephone number statistics from the session database to begin determining which of the telephone numbers to re-assign. The telephone number statistics may include, for example, the date of the last text message in each session, the time of the last text message in each session, the content of the last text message, the number of text messages in each session, or the frequency with which text messages were sent within each session, etc. According to at least one of these statistics, the processor may determine from which session the telephone number should be reallocated to the new session in need of a telephone number and channel.

As one example of a rules-based selection process, FIG. 6 shows that the processor begins by determining the session with the oldest most recent text message. If the oldest most recent text message of the session is also at least twenty-four hours old (612), the processor selects the telephone number from this session and reallocates (616) the identified telephone number to the new text message session. If the oldest most recent text message is less than twenty-four hours old (612), then the processor may instead select (614) the telephone number of the session that has been used the least frequently, and may reallocate (616) the identified telephone number of the least frequent session to the new session. Using this method of reallocating a telephone number may provide the least impact to channels that are used frequently by the user and the entity to communicate with one another. In addition, such a procedure may ensure that a very recently allocated telephone number is not reallocated simply because there has not been a responsive text message yet.

The above rules-based selection example, and the time threshold of twenty-four hours in block 612 is only used for exemplary purposes. In other implementations, rules may be defined that operate in similar or different manners, such as by identifying a different session parameter to determine which of the allocated telephone numbers should be reallocated. Similarly, the time threshold may be shorter than twenty-four hours or even much longer than twenty-four hours. For example, the time threshold may be set to two hours such that any session without a reply within a two hour period is subject to telephone number reallocation. Alternatively, a longer time threshold of seven days may be applied in order to focus on reallocating telephone numbers primarily from infrequently used channels.

After the telephone number has been reallocated to the new text message session, the processor of the telephone number allocation system may accordingly update (618) the session database. The session server may also transmit the text message information to the user via SMS system, or may forward the text message session to a computer system, depending upon the sender and recipient of the text message. Subsequent responsive text messages sent to or received from the allocated telephone number may similarly be directed to the already created channel and inserted into the session.

Figure 7:
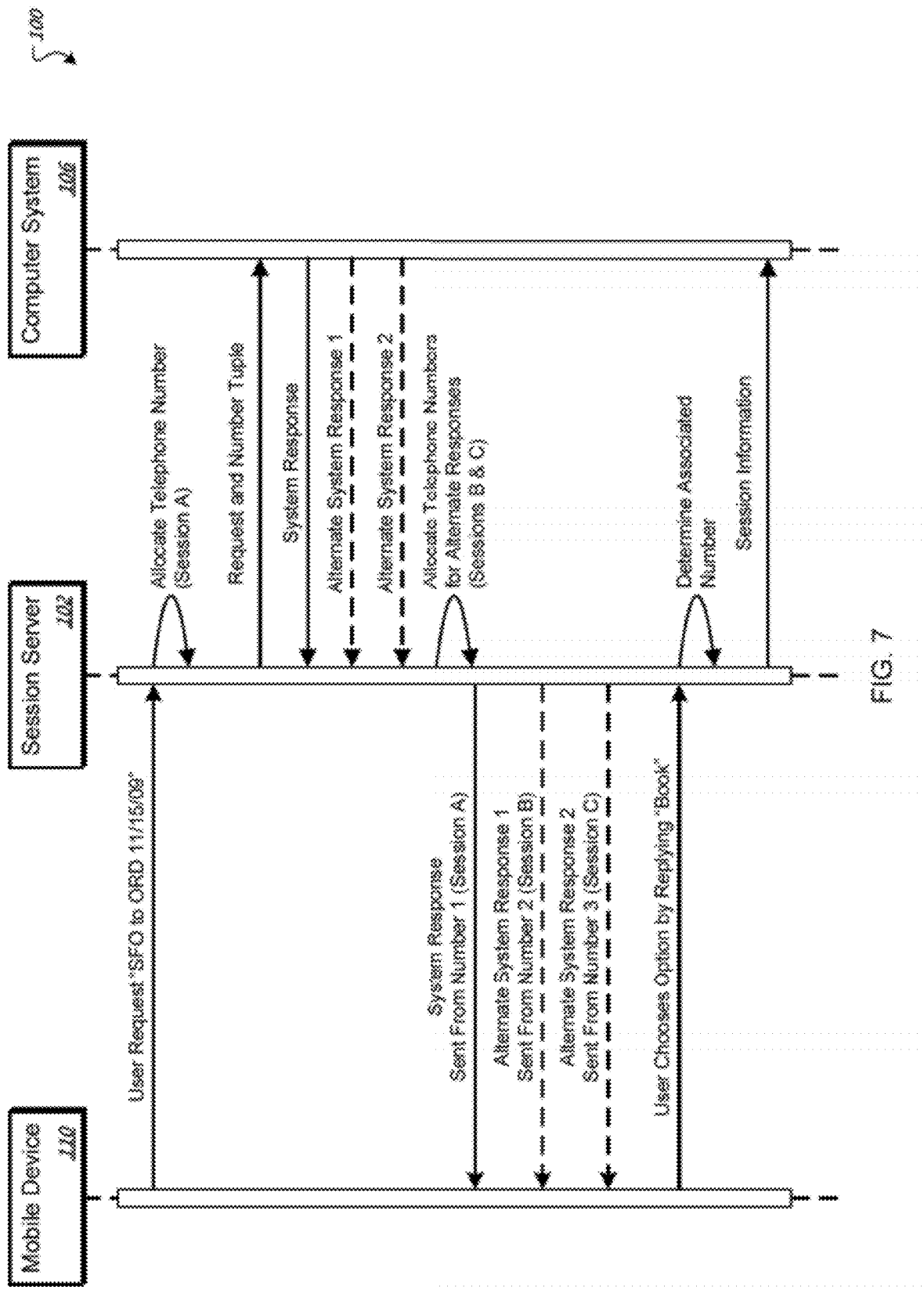
FIG. 7 is a swim lane diagram of an example threaded text message transaction.

FIG. 7 is a swim lane diagram of an example threaded text message transaction between a user of a mobile device 110 and an entity operating a computer system 106. The transaction may be facilitated by a session server 102, and may occur in a system, such as the text message session system 100 described above.

In the example, a user of the mobile device 110 may wish to book a flight from an airline that operates the computer system 106. As such, the user may text the message "SFO to ORD Nov. 15, 2009" to a number at a particular airline that accepts such texts as flight requests. The message "SFO to ORD Nov. 15, 2009" may indicate that the user is looking for flights from San Francisco to Chicago O'Hare on Nov. 15, 2009. The message may be received by an SMS server and route the message to a session server 102 that receives text messages sent to the airline text message number. Upon receiving the message, the session server 102 may determine that the request warrants a new session to be created because it is the first message of the transaction between the user and the airline, and may allocate a telephone number from a pool of telephone numbers to form the session (Session A).

The request and the allocated telephone number and/or session information may then be sent to the airline computer system 106 for processing. Upon receiving the request, the airline computer system 106 may identify one or more flights that satisfy the user's request, and may send each of the possible flights as separate text messages back to the user via the session server 102.

Since the session server 102 already has one session open between the user and the airline computer system, it may continue to use that session (Session A) to present a first flight to the user. If additional flights are available that meet the user's criteria, different sessions using different numbers may be allocated to each of the options to appropriately distinguish one flight option from the other when the user responds. As such, the session server 102 may allocate a second number for the second flight option (Session B), and may allocate a third number for the third flight option (Session C). The session server 102 may then send each of these responses to the user for perusal on the mobile device 110.

If the user wishes to book any of the flight options, he may simply reply to the appropriate text message (e.g., the text including the desired flight option) with a one word reply (e.g., "Book") to book the flight. When the one-word reply is received by the session server 102, it may identify the appropriate session based on the number that the text message was sent to, and may update the session with the user's response. In certain implementations, the entire thread of the session may then be sent to the airline computer system 106. For example, a session including the following information may be sent to the airline: "SFO to ORD Nov. 15, 2009" corresponding to the user's initial request; "Flight 1125 AirTravel Airlines Nov. 15, 2009 Departs SFO11:00, Arrives ORD 3:25. Price: $422" corresponding to one of the flight options sent from the airline to the user in response to the initial request; and "Book" corresponding to the user's desire to reserve a seat on the flight.

In a typical text message application, the single-word text message of "Book" from a user may be unclear in terms of understanding the user's intentions, but in the context of a threaded session as described herein, the message is clear. Since the short text message reply is sent to a specifically allocated telephone number, the session server 102 can identify to which text message from the computer system 106 that the text message reply is referring. In other implementations, certain portions of the entire session, or just the text message reply may be sent to the computer system 106. In either case, the computer system 106 will be able to identify the text message reply as responsive to a specific previous text message based on the session with which the reply is associated.

Figure 8:
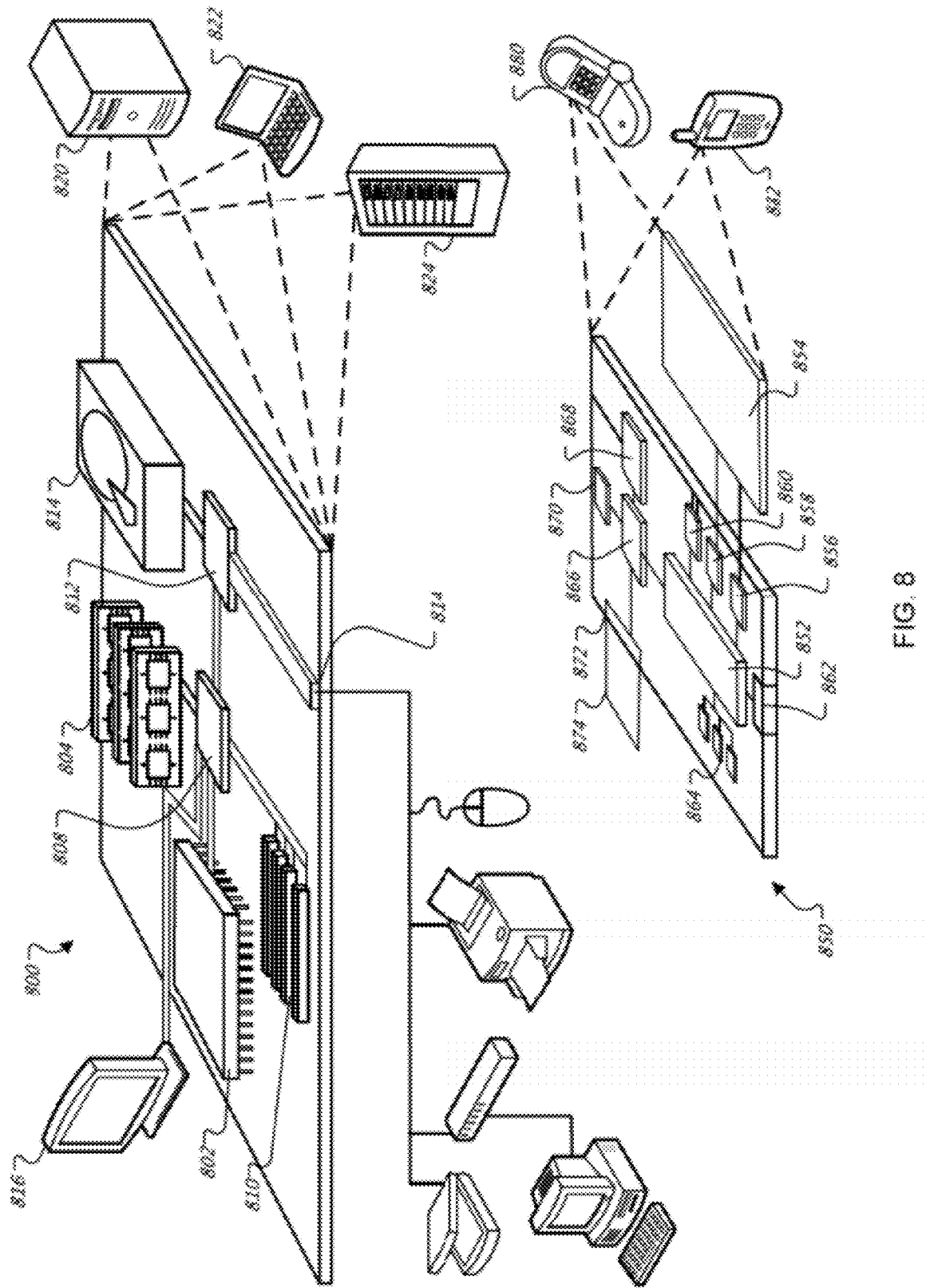
FIG. 8 shows an example of a computer device and a mobile device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 800 includes a processor 802, memory 804, a storage device 814, a high-speed interface 808 connecting to memory 804 and high-speed expansion ports 810, and a low speed interface 812 connecting to low speed bus 814 and storage device 814. Each of the components 802, 804, 814, 808, 810, and 812, are interconnected using various busses, and may be mounted on a common motherboard or in other manners as appropriate. The processor 802 can process instructions for execution within the computing device 800, including instructions stored in the memory 804 or on the storage device 814 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 814 is capable of providing mass storage for the computing device 800. In one implementation, the storage device 814 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 814, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 814 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in FIG. 8. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. For example, much of this document has been described with respect to commercial transactions using threaded SMS sessions, but the threaded SMS sessions may be used in several different environments, both commercial and non-commercial in nature. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for threading text messages, the method comprising:
receiving a text message associated with a first telephone number;
establishing a communication session associated with the received text message, wherein the establishing includes modifying the received text message so that the received text message is associated with a second telephone number that is different from the first telephone number, and further wherein subsequent text messages associated with the second telephone number are included as part of the established communication session;
transmitting the text message to a text messaging system, wherein the text message appears to have originated from the second telephone number;
receiving a text message reply from a user in response to the transmitted text message, wherein the text message reply is addressed to the second telephone number; and
associating the text message reply with the established communication session, wherein the session includes the transmitted text message, the text message reply, and information associated with the user.

2. The method of claim 1, wherein the second telephone number is selected from a telephone number pool having a plurality of telephone numbers.

3. The method of claim 2, wherein selecting the telephone number is based on at least one of the group consisting of (i) a quantity of text messages associated with each of the telephone numbers in the telephone number pool, (ii) a date of a most recent text message associated with each of the telephone numbers in the telephone number pool, and (iii) a frequency of text message activity associated with each of the plurality of telephone numbers in the telephone number pool.

4. The method of claim 1, wherein the second telephone number is reallocated from a previously used communication session.

5. The method of claim 1, further comprising associating the user with a plurality of communication sessions each defined by a different one of a plurality of telephone numbers.

6. The method of claim 1, further comprising receiving a voice call reply to the second telephone number in response to the transmitted text message, and directing the voice call reply to an operator at a telephone number that is different from the second telephone number.

7. The method of claim 1, wherein modifying the received text message comprises making the text message appear to have originated from the second telephone number.

8. A computer program product tangibly embodied in a non-transitory machine-readable medium, the computer program product including instructions that, when executed, perform a method of threading text messages, the method comprising:
- receiving a text message associated with a first telephone number;
- establishing a communication session associated with the received text message, wherein the establishing includes modifying the received text message so that the received text message is associated with a second telephone number that is different from the first telephone number, and further wherein subsequent text messages associated with the second telephone number are included as part of the established communication session;
- transmitting the text message to a text messaging system, wherein the text message appears to have originated from the second telephone number;
- receiving a text message reply from a user in response to the transmitted text message, wherein the text message reply is addressed to the second telephone number; and
- associating the text message reply with the established communication session, wherein the session includes the transmitted text message, the text message reply, and information associated with the user.

9. The computer program product of claim 8, wherein the second telephone number is selected from a telephone number pool having a plurality of telephone numbers.

10. The computer program product of claim 9, wherein selecting the telephone number is based on at least one of the group consisting of (i) a quantity of text messages associated with each of the telephone numbers in the telephone number pool, (ii) a date of a most recent text message associated with each of the telephone numbers in the telephone number pool, and (iii) a frequency of text message activity associated with each of the plurality of telephone numbers in the telephone number pool.

11. The computer program product of claim 8, wherein the second telephone number is reallocated from a previously used communication session.

12. The computer program product of claim 8, further comprising associating the user with a plurality of communication sessions each defined by a different one of a plurality of telephone numbers.

13. The computer program product of claim 8, further comprising receiving a voice call reply to the second telephone number in response to the transmitted text message, and directing the voice call reply to an operator at a telephone number that is different from the second telephone number.

14. The computer program product of claim 8, wherein modifying the received text message comprises making the text message appear to have originated from the second telephone number.

15. A system for threading text messages, the system comprising:
- a communication module to receive a text message associated with a first telephone number;
- a session server to establish a communication session associated with the received text message, wherein session server establishes communication session by modifying the received text message so that the received text message is associated with a second telephone number that is different from the first telephone number, and further wherein subsequent text messages associated with the second telephone number are included as part of the established communication session;
- a session database that stores information associated with the communication session, including the text message and the second telephone number; and
- a transmission module to transmit the text message to a text messaging system, wherein the text message appears to have originated from the second telephone number, and wherein, upon receiving a text message reply addressed to the second telephone number from a user in response to the transmitted text message, the text message reply and information associated with the user is stored in the session database.

16. The system of claim 15, further comprising a telephone number allocation module to select the second telephone number from a telephone number pool having a plurality of telephone numbers.

17. The system of claim 16, wherein the telephone number allocation module selects the telephone number based on at least one of the group consisting of (i) a quantity of text messages associated with each of the telephone numbers in the telephone number pool, (ii) a date of a most recent text message associated with each of the telephone numbers in the telephone number pool, and (iii) a frequency of text message activity associated with each of the plurality of telephone numbers in the telephone number pool.

* * * * *